United States Patent

[11] 3,554,466

| [72] | Inventors | T. O. Paine, Administrator of the National Aeronautics and Space Administration, in respect to an invention of Wayne B. Lloyd, Baltimore, Md. |
| --- | --- | --- |
| [21] | Appl. No. | 808,193 |
| [22] | Filed | Mar. 18, 1969 |
| [45] | Patented | Jan. 12, 1971 |

[54] BEARING AND GIMBAL LOCK MECHANISM AND SPIRAL FLEX LEAD MODULE
7 Claims, 6 Drawing Figs.

[52] U.S. Cl. ..................................................... 244/1, 74/5.12, 308/1
[51] Int. Cl. ..................................................... B64g 1/00
[50] Field of Search .......................................... 244/1SS, 77SS; 248/179, 184, 284, (Inquired); 74/5.1, 5.12, (Inquired); 308/(Inquired)

[56] References Cited
UNITED STATES PATENTS

| 3,012,439 | 12/1961 | Ransom et al. |
| 3,019,662 | 2/1962 | Gabin. |
| 3,250,135 | 5/1966 | Minihan. |
| 3,267,748 | 8/1966 | Conklin, Jr. |
| 3,473,391 | 10/1969 | Williamson et al. |

Primary Examiner—Milton Buchler
Assistant Examiner—Jeffrey L. Forman
Attorneys—R. F. Kempf, E. Levy and G. T. McCoy ABSTRACT: The invention relates to a two-axis gimbal supported payload of an orbital spacecraft. In normal orbit operation, the gimbal is supported along each of its rotational axes by a sleeve and thrust bearing assembly permitting pivotal motion of the gimbal in response to relatively low amplitude loads occasioned by orbital forces. Initially, the sleeve and thrust bearings are disengaged from the gimbal and a gimbal lock mechanism restrains pivotal motion of the gimbal during launch of the spacecraft. The gimbal lock mechanism further sealably contains the sleeve and thrust bearings thereby isolating them from contaminants until attaining a required orbit. A spring motor is actuated to disengage the gimbal lock mechanism and engage the sleeve and thrust bearings subsequent to launch. Electrical conductors in the form of metal strips, together with an associated insulating strip, are wrapped spirally about a rotational axis of the gimbal to provide power conduction to the gimbal payload without introduction of restraining forces which would interfere with the angular movement of the suspended gimbal.

PATENTED JAN 12 1971
3,554,466
SHEET 1 OF 3
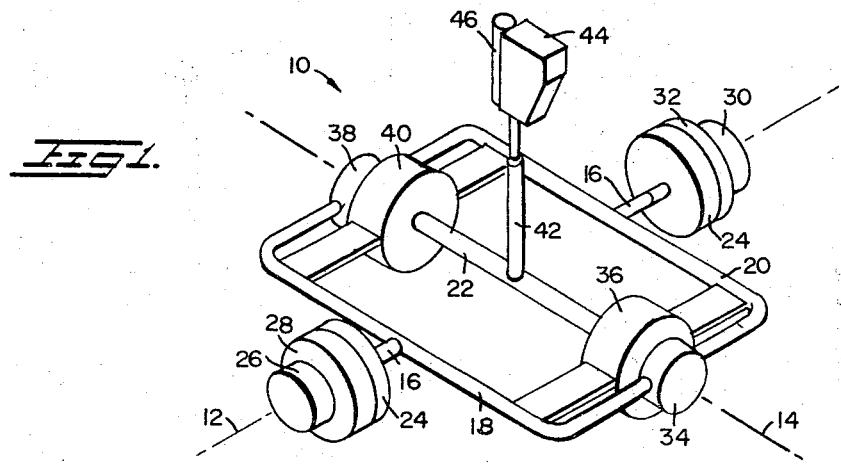
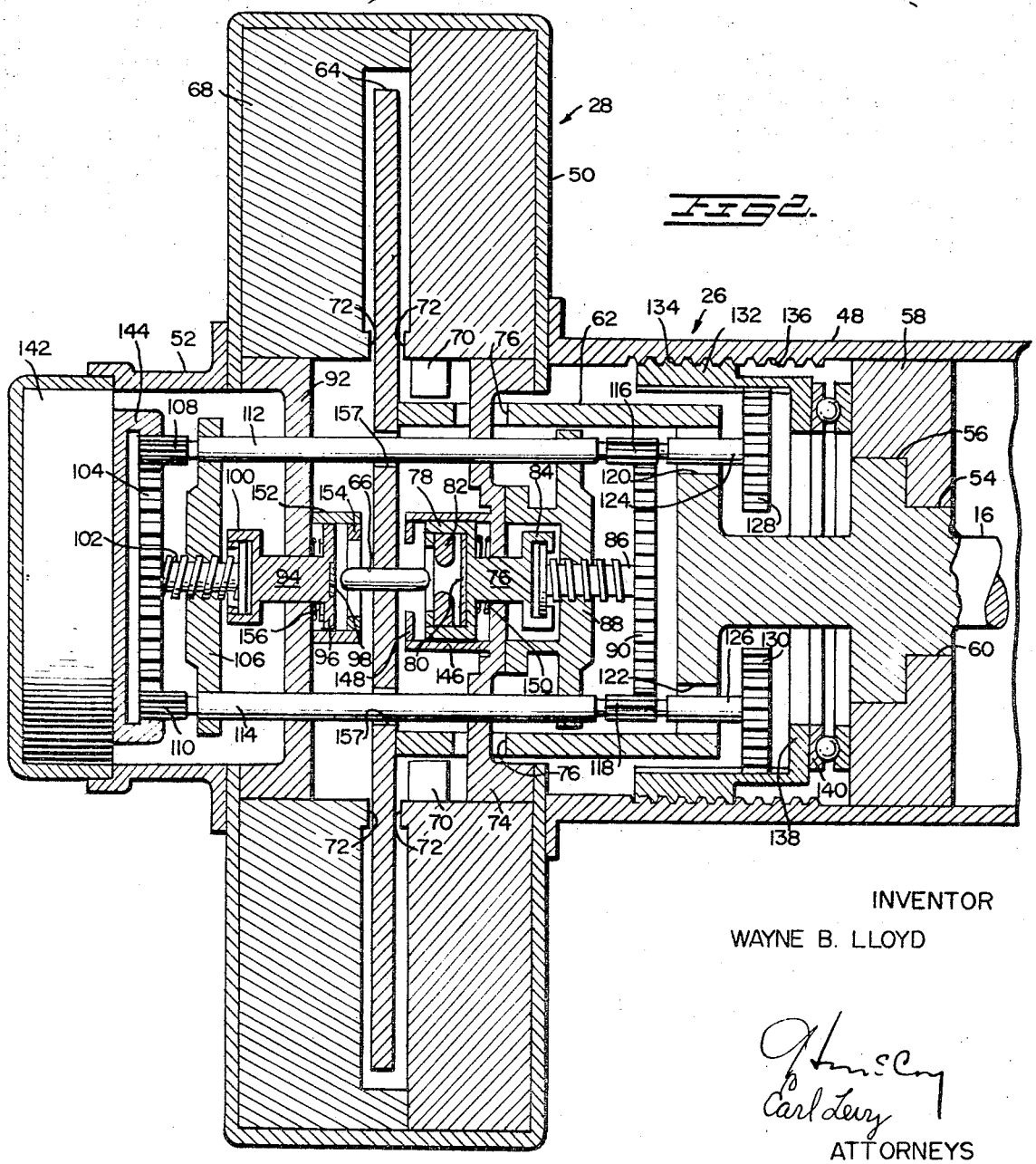
INVENTOR
WAYNE B. LLOYD
ATTORNEYS

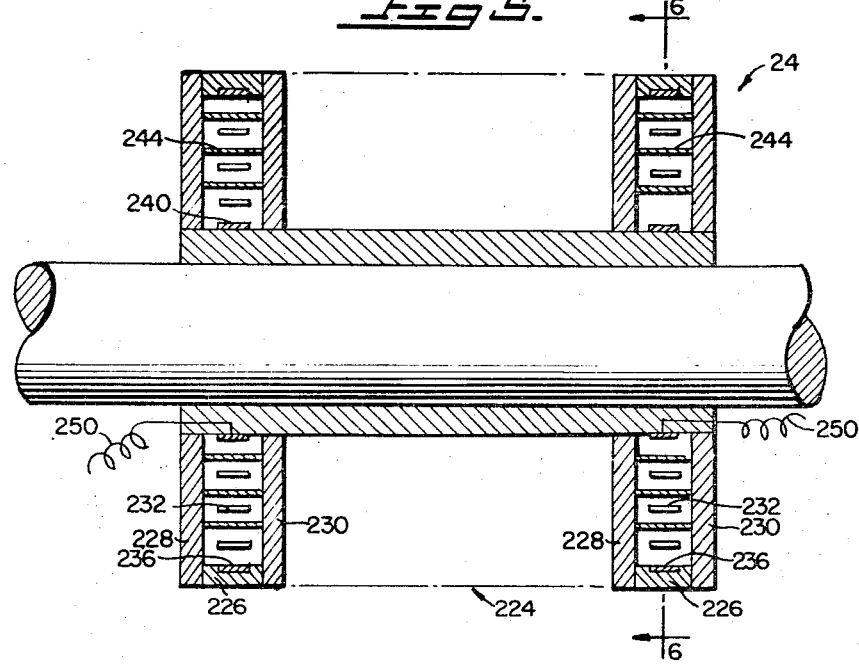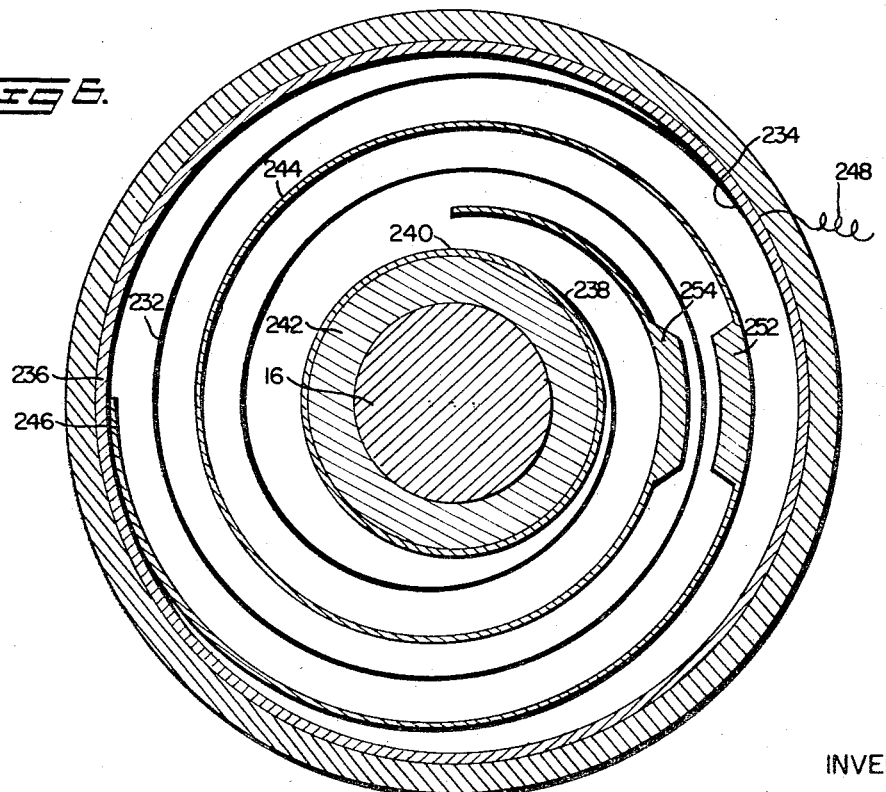

BEARING AND GIMBAL LOCK MECHANISM AND SPIRAL FLEX LEAD MODULE

The invention described herein was made in the performance of work under a NASA contract and is subject to the provisions of section 305 of the National Aeronautics and Space Act of 1958. Public Law 85-568 Stat. 434; 42 USC 2457.

The present invention relates to bearing and gimbal lock apparatus for supporting a two-axis gimbal carrying a payload such as a spacecraft gravity gradient stabilization boom provided with an end mass. More specifically, the invention relates to sleeves and thrust bearings providing low friction rotational supports along each axis of the gimbal, the bearings thereby permitting angular motion of the gimbal in response to relatively low amplitude loads experienced in orbit. The invention is further characterized by a gimbal lock mechanism which initially restrains angular motion of the gimbal, thereby preventing motion thereof in response to damaging forces occasioned by loads associated with spacecraft launch. Additionally, during spacecraft launch the sleeve and thrust bearings are disengaged from the gimbal, the gimbal lock mechanism further serving to encase the sleeve and thrust bearings to prevent exposure thereof to contamination. Electrical leads are supplied to the electrical components carried by the gimbal, which leads each comprises a metal strip with an associated insulating strip spirally wrapped in scroll fashion about a pivotal axis of the gimbal, the spiral configuration of the leads preventing excessive loading or motion restraining of the sleeve and thrust bearing suspended gimbal.

Accordingly, it is an object of the invention to provide low friction rotational support for a freely pivotal, suspended gimbal.

A further object of the invention is to provide a gimbal lock mechanism initially restraining pivotal motion of a gimbal during an interim of relatively high loads.

A further object of the invention is to provide apparatus for disengaging a motion restraining mechanism from a gimbal and for engaging a low friction rotational support on said gimbal.

A further object of the invention is to provide a motion-restraining mechanism initially preventing pivotal motion of a gimbal and isolating the suspension system of the gimbal from contaminants.

Another object of the invention is to provide apparatus for actively disengaging a motion restraining mechanism from a gimbal and simultaneously engaging bearing supports on said gimbal for suspending the gimbal for two-axis angular motion in response to relatively low amplitude loads.

Yet another object of the invention is to provide electrical conductors for a pivotally supported gimbal, which conductors are spirally wrapped about a pivotal axis of the gimbal and so constructed and arranged to provide electrical current paths to electrical components carried by the gimbal without introducing loads or further restraining the angular motion of said gimbal.

Other objects and many attendant advantages of the present invention will become apparent upon a perusal of the following detailed description thereof taken in conjunction with the accompanying drawings wherein:

FIG. 1 is a schematic in perspective of the bearing and gimbal lock apparatus and spiral flex lead module according to the invention;

FIG. 2 is a detail cross section of a bearing and gimbal lock apparatus as illustrated in FIG. 1;

FIG. 5 is a detailed section of the spiral flex lead module as illustrated in FIG. 1; and FIG. 6 is a section generally along the lines 6-6 of FIG. 5.

Figure 3:
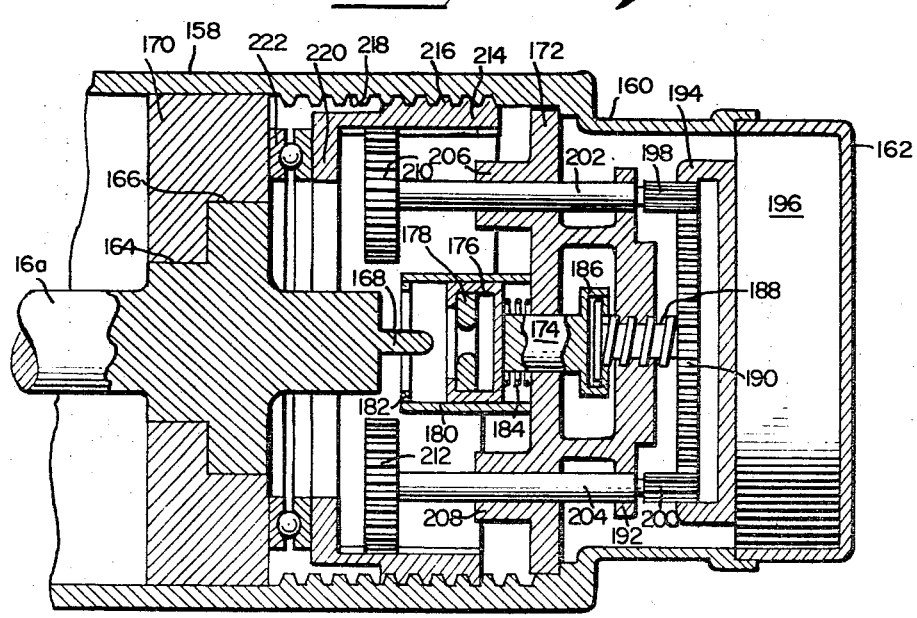
FIG. 3 is a detail cross section of an additional embodiment of a bearing and gimbal lock apparatus according to the invention and used in conjunction with the apparatus as illustrated in FIG. 2 for supporting and restraining the motion of a gimbal along one pivotal axis thereof.

With more particular reference to the drawings, there is shown in FIG. 1 a two-axis pivotal gimbal, generally indicated at 10, and pivotal about a first axis 12 and a second orthogonal axis 14. For example, the gimbal 10 is pivotal about the first axis 12 by rotation upon a shaft 16 and 16a which, as shown in the FIG. is discontinued through the area defined by the encircling gimbal arms 18 and 20. The gimbal 10 will pivot about the second axis 14 by rotation upon a shaft 22 extending generally centrally through the area defined by the gimbal arms 18 and 20. Each extended portion of the shaft 16 extends axially through a generally cylindrical spiral flex lead module 24. Additionally, one end of the shaft 16 is provided with a supporting bearing and gimbal lock 26 provided integrally with an enlarged cylindrical encoder assembly 28. The opposed end 16a of the shaft 16 is provided with a complimentary bearing and gimbal lock mechanism 30 with an associated torquer assembly 32. The shaft 22 is provided at one end with a supporting bearing and gimbal lock assembly 34 located axially along the shaft 22 and at the intersection of arms 18 and 20. Integrally associated with the bearing and gimbal lock mechanism 34 is an encoder 36. The opposite end of the shaft 22 is provided with a complimentary bearing and gimbal lock mechanism 38 associated with an enlarged cylindrical torquer assembly 40. The bearing and gimbal lock mechanism 38 is located axially on a shaft 22 and at the intersection of arms 18 and 20. The payload for the two-axis pivotal gimbal 10 is located centrally of the shaft 22 and comprises a relatively large mass extensible boom 42 secured to the shaft 22 in any well-known manner. A boom deployer 44 and associated power source 46 is carried on the boom end and utilized accordingly as a tip mass. As well known in the prior art, the boom and associated tip mass may be used for gravity gradient stabilization of a spacecraft to which the gimbal may be pivotally supported on the bearing and gimbal lock mechanisms in a manner to be hereinafter explained in detail.

Accordingly, the gimbal supported boom comprises a gravity gradient control system which is sleeve and thrust bearing suspended for low friction pivotal motion with 2° of angular freedom with respect to a spacecraft on which the gimbal is mounted. Further the gimbal is characterized by an optical shaft encoder and a DC torquer provided for each gimbal axis for actively torqueing and controlling the pivotal motion of the gimbal. The encoder and torquer will not be described in detail since they comprise well known apparatus for controlling pivotal motion of prior art gimbal systems.

With more particular reference to FIG. 2, a detailed section of the bearing and gimbal lock mechanism 26 and encoder 28 is illustrated. Since the bearing and gimbal lock mechanism 34 and the encoder 36 are similar in construction it is to be understood that the following detailed description also applies thereto. According to the FIG. the bearing and gimbal lock mechanism 26 includes a generally cylindrical housing 48 in communication with an enlarged cylindrical housing 50 forming the enclosure for the encoder 28. The encoder housing 50 is communicable with a spring motor housing 52 generally of reduced diameter cylindrical configuration and secured thereto in any well-known manner.

A portion of the gimbal shaft 16 is received centrally within the housing 28, which shaft is provided with a first stepped enlarged diameter portion 54 immediately adjacent to a second stepped enlarged diameter portion 56.

Slidably received in one end of the housing 28 is a generally annular lock and seal ring 58 having an internal opening 60 of complimentary configuration to the enlarged diameter stepped portions 54 and 56. Interiorly of the housing 28 the shaft 16 is provided with an enlarged diameter generally cylindrical portion defining a gimbal shaft cage 62. The cage 62 has affixed thereto an enlarged diameter encoder disc 64. The encoder disc 64 is pivotally received generally centrally of the housing 50 and is provided with a laterally extended, reduced diameter cylindrical journal 66 having rounded end portions and extending coaxially with the shaft 16. The particular details of the encoder will not be described, its being understood that it is of a well-known type having an optical sensing mechanism 68 which optically detects the angular motion of the encoder disc about the axis of the shaft 16 and in response thereto supplies information to the torquer 32 (or 40) for controlling the oscillations of the shaft 16.

For example, the mechanism 68 is provided with mechanical limiters 70 in opposed relationship, extending radially with respect to the cylindrical journal 66 and immediately adjacent opposed sides of the gimbal shaft cage 62. Axially projecting mechanical limiters 72 of opposed facing relationship are disposed immediately adjacent opposed sides of the encoder disc 64. The projecting limiters are provided to aid in positioning the gimbal shaft cage 62 and the encoder disc 64 and further to enable positioning of the journal 66 in alignment with its bearings, to be hereinafter described in detail.

With further reference to FIG. 2, a generally vertically extending support 74 extends through the cage 62 which is provided with clearance openings 76 receiving the support member 74. The support member 74 slidably receives a shaft 76 extending centrally therethrough and provided at one end with an enlarged cup 78. The shaft 76 and the cup 78 are in axial alignment with the major axis of the journal 66, the bottom wall of the cup 78 being provided with a thrust bearing 80 and the sidewalls of the cup 78 being provided with an annular sleeve bearing 82, the central opening thereof being defined by a rounded annular sidewall. As will be hereinafter explained in detail, the thrust and sleeve bearings are provided to support the journal 66 and thereby the shaft 16 (or 22) of the gimbal 10. On the opposite end of the shaft 76 is provided a cup 84 which rotatably received the enlarged head of a drive shaft 86 threadably received on a generally U-shaped portion 88 of the support 74. The drive shaft 86 is secured centrally of an enlarged diameter bearing drive gear 90. On the opposite side of the encoder disc 64 is a generally vertically extending support 92 complimentary in configuration to the support 74 and provided centrally thereof with a slidably received shaft 94 having an enlarged cup receiving a thrust bearing 98 in axial alignment with and in opposed relationship with respect to a rounded end portion of the cylindrical journal 66. The opposite end of the shaft 94 is provided with an enlarged cup 100 which rotatably receives the enlarged head of a drive shaft 102, similar in configuration to the drive shaft 86. The drive shaft 102 is secured centrally of an enlarged diameter drive gear 104 similar in configuration to the drive gear 90. As shown in the FIG., the shaft 102 is supported on a generally U-shaped support 106 similar in construction to the support 88.

The drive gear 104 is power connected to the gear 90 in the following manner. The gear 104 intermeshes with a pair of spaced pinions 108 and 110, respectively connected to elongated power shafts 112 and 114, each extending through the supports 92 and 74, the encoder disc 64, and rotatably supported on laterally extending portions of the U-shaped supports 106 and 88. The opposite ends of the power shafts 112 and 114 are respectively provided with pinions 116 and 118 which intermesh with the driving gear 90. Further, the shafts 112 and 114 extend through the cage 62 and protrude therefrom, the cage being provided with clearance apertures 120 and 122 receiving the extended end portions 124 and 126 of the shafts 112 and 114. Spur gears 128 and 130 are secured to the end portions 124 and 126. Each of the spur gears engages on the inner annular threaded portions of an annular gear 132 surrounding and threadably engaging the gears 128 and 130. The outer cylindrical periphery of the annular gear 132 is threaded at 134 and mately engages a threaded annular interior portion 136 of the housing 48.

An end portion of the annular gear 132 is provided with an inwardly projecting annular flange 138 which impinges against an enlarged diameter thrust bearing 140 which is engaged by the flange 138 and the generally annular lock and seal ring 58.

Within the spring motor housing 52 is shown schematically a spring motor 142 for a purpose to be hereinafter described. The spring motor may be of any well-known type and may be provided with an enlarged diameter internal gear 144 which mates with the spur gear 108.

As shown in the FIG., the bearing cup 78 is slidably mounted within a generally cylindrical sleeve 146 provided at its open terminal end with an inwardly selected annular flange 148 providing a stop for the cup 78 as will be hereinafter explained in detail. The shaft 76 is surrounded by a compressed coil spring 150. The cup 96 is slidably mounted in a generally cylindrical sleeve 152 secured in any well-known manner to the support 92, which sleeve is provided at its open end with an inwardly directed flange 154 providing a stop for the cup 96. A compressed coil spring 156 surrounds the shaft 94 and impinges against the support 92 and the cup 96. The encoder disc 64 is provided with clearance slots 157 providing clearance for the power shafts 112 and 114.

With more particular reference to FIG. 3, there is shown a detail section of the bearing and gimbal lock mechanism 30 of FIG. 1. The bearing and gimbal lock mechanism 38, provided on the shaft 22, is similar in configuration and the following detailed description additionally applies thereto. With reference to the FIG., the bearing and gimbal lock mechanism 30 is shown with an outer cylindrical, enlarged diameter housing 158 provided with a reduced diameter portion 160 secured in any well-known manner to an enclosing spring member housing 162. A portion of the shaft 16a is shown received in an open end portion of the housing 13 138 and is provided with a first stepped, enlarged diameter portion 164 immediately adjacent a second stepped enlarged diameter portion 166.

The end of the shaft 16a terminates in a reduced diameter cylindrical journal 168 provided with a spherical end portion. Slidably received in the open end portion of the housing 158 is a generally annular lock and seal ring 170 surrounding and complimentary in configuration with the stepped portions 164 and 166. The enlarged diameter portion of the housing 158 is provided interiorally at one end thereof with a support 172 which slidably receives centrally thereof a shaft 174 provided at one end with a cup 176. Contained within the cup 176 is a sleeve bearing 178 the central opening thereof being defined by a rounded sidewall configuration for receiving the cylindrical journal 168 in a manner to be hereinafter explained.

The cup 176 is slidably received in a generally cylindrical sleeve 180 secured to the support 172 in any well-known manner. The sleeve 180 is provided at its open end thereof with an inwardly directed annular flange 182, providing a stop for the cup 176. The shaft 174 is surrounded by a compressed coil spring 184, the ends of which impinge against the support 172 and the cup 176. The opposite end of the shaft 174 is provided with an enlarged diameter cup 186 which rotatably receives an enlarged end portion of a threaded drive shaft 188 which is secured centrally of an enlarged diameter drive gear 190.

As shown in the FIG., a generally U-shaped support 192 threadably receives and supports the drive shaft 188. The enlarged drive gear 190 matingly engages an enlarged diameter internal gear 194 which is connected to a spring motor shown schematically at 196 which motor may be of any well-known type and contained within the housing 162. A pair of spaced pinions 198 and 200 matingly engage the enlarged diameter drive gear 190 and are connected to elongated power shafts 202 and 204, respectively.

The power shafts are rotatably received in enlarged projecting portions 206 and 208 of the support 172. The ends of the power shafts 206 and 208 are provided with spur gears 210 and 212. The spur gears respectively engage upon the inner threaded cylindrical sidewall of a ring configured drive nut 214. The outer cylindrical periphery of the drive nut is provided with enlarged threads 216 engaging the cylindrical interior threaded portion 118 of the housing 158. The end portion of the drive nut is provided with an inwardly directed annular flange 220 impinging against an enlarged diameter thrust bearing 222, which bearing is engaged by the flange 220 and the lock and seal ring 170.

Figure 4:
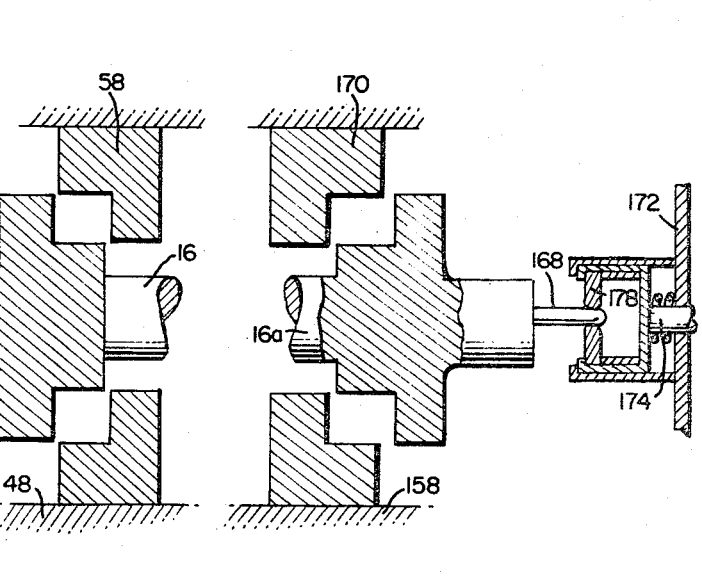
FIG. 4 is a detail cross section, illustrating in schematic the bearing and gimbal lock apparatus of FIGS. 2 and 3 with the bearings engaged on the gimbal and the gimbal lock mechanism disengaged from the gimbal.

In operation of the bearing and gimbal lock mechanisms of FIGS. 2 and 3, reference will now be made to FIG. 4. According to the invention, the bearings are designed to support only those loads encountered by the gimbal in orbit after deployment of the boom. If the bearings were designed to withstand much larger loads such as those encountered during launch or deployment of a spacecraft, much larger diameter bearings with larger contact area would be required. Such large bearings would produce higher static friction, thereby impeding the pivotal movement of the gimbal about its axes, and further would be susceptible to particulate contamination.

Accordingly, the initial loads associated with launch and deployment are transmitted to the gimbal lock rings 58 and 170, which, as shown in FIGS. 2 and 3 are engaged initially on the stepped diameter shafts 16 and 16a. With the locking rings engaged on the stepped diameter of the shafts 16 and 16a, the complimentary geometries of the rings and the stepped diameters will prevent radial motion of the shafts 16 and 16a. Additionally, contamination is excluded from the interior of the housings 48 and 158, the locking rings further retaining a contamination free atmosphere within the housings, thereby insuring reliable exclusion of contamination after a long delay in orbit before deployment of the gimbal system 10.

For example, spline slots (not shown) may be provided on the lock and seal rings which may include complimentary spline teeth (not shown) on the shafts 16 and 16a and the associated housings 48 or 158, thereby preventing rotational motion of the shaft during launch and deployment.

As shown in the FIGS., the thrust and sleeve bearings are disengaged initially from the associated journals 66 and 168 in order to prevent damage thereto during the shock and vibration of launch and boom deployment. Additionally, with the bearings so removed, their protection is assured without requiring absolute avoidance of motion of the gimbal and the need for precision between the complimentary geometries of the locking rings and the stepped diameters of the shaft 16.

The radial sleeve bearings 82 and 178 are fabricated from a hard, high strength material suitable for use in hard vacuum environment, for example, synthetic ruby. Such strength and hardness characteristics are desirable to permit fabrication of a small sleeve diameter and minimum bearing contact area. As shown in the drawings, entrances to the bearing bores are well rounded to facilitate registration and draw-in of the journals 66 and 168 to be hereinafter explained in detail. Further, such geometry reduces the probability of dirt entrapment and the generation of particles during axial motion of the gimbal suspended on the bearings. Use of relatively small sleeve diameters insures that any particulate contamination present will be easily sheared without producing undue friction that would interfere with pivotal operation of the gimbals.

The journals 66 and 168 are also of hard-strength material, for example, hardenable stainless steel. The thrust bearings 80 and 98 are of the same material as the radial sleeve bearings. Each thrust bearing is located as close as possible to the encoder disc 64, since the most critical axial clearance requirements of the gimbal suspension bearings occur between the encoder disc and the associated encoder device 68. The dimensional accuracy required of the thrust bearings are a function of the respective temperatures of the shaft 76 and 94 and the frame supports 74 and 90. Lengths of the journals 66 and 168 are functions of the encoder disc temperature and the temperature of the gimbal shaft 16. Since these temperatures are not likely to be the same, and since different fabrication materials are involved, it is likely that thrust bearing locations and axial clearances thereof will vary with the temperature. Accordingly, the axial length of the journal 66 is kept small to minimize clearance variation due to temperature changes. Additionally, the thrust bearings are kept symmetrical about the encoder, thereby further minimizing the effects of clearance variations. It is to be understood that the invention is not limited to the geometries of the bearings shown. For example, the bearings 82 and 178 may be of cylindrical configuration, while the journals 66 and 168 may be provided with enlarged spherical end portions so as to form a ball-and-sleeve bearing geometry.

The mode of power required to move the locking rings and release the gimbal shaft 16 and 16a is derived from the spring motors 141 and 196. With reference to FIGS. 2 and 4, the spring motor 142, when electromagnetically released by a proper command signal, rotates the internal gear 144, which, in turn, rotates the enlarged drive gear 104. Accordingly, the power shaft 112 and 114 are rotated in order to drive the enlarged drive gear 90. Rotation of the power shafts also rotates the spur gears 128 and 130, which, in turn, advance the ring gear 132. As the ring gear advances, force is transmitted through the enlarged diameter thrust bearing 140 to slidably move the lock ring 58, thereby disengaging it, as shown in FIG. 4, from the stepped diameter of the shaft 16.

Upon rotation of the enlarged diameter drive gears 104 and 90, the associated shaft 102 and 86 are advanced to slidably move the shafts 94 and 76, thereby engaging the thrust bearings 98 and 80 against the spherical end portions of the journal 66. Additionally, the sleeve bearing 82 is advanced over one end of the journal 66 thereby suspending one end of the shaft 16 for low friction pivotal motion in response to relatively low amplitude loads occasioned by the gimbal 10 in orbit.

As the lock ring is disengaged from the stepped diameter shaft 16 and the thrust and sleeve bearings are positioned on the journal, the shaft 16 is retained in radial and axial alignment by the projecting limiters 70 and 72 which prevent inadvertent displacement of the journal 66 beyond the tolerances permitted by the draw-in capabilities of the sleeve and thrust bearings. The thrust bearings are prevented from overload after engagement on the journal 66. More specifically, the coil springs 150 and 156 force their associated bearing cups 78 and 96 against the stops 148 and 154, thus providing positive positioning of the thrust bearings. However, if a thrust overload is experienced, the springs 150 and 156 will yield to permit motion of the thrust bearings to absorb the overload. Further overload protection is provided by the hard stops of the encoder discs 64 against the mechanical-projecting limiters 72. Accordingly, axial overload is absorbed first by soft stops provided by the coil springs and second by the hard stops provided by the limiters.

Accordingly, the end of the shaft 16 is suspended for relatively low friction free rotation upon its journal supported in the sleeve and thrust bearings 82, 98 and 80. To insure friction free pivotal motion of the shaft, the apertures 76 of the gimbal shaft cage 62 are configured as arcuate slots permitting clearance for the support 74 as the cage 62 pivots together with the shaft 16. Additionally, the slots 157 of the encoder disc 64 and the apertures 120 and 122 of the gimbal shaft cage 62 are of similar arcuate configuration.

With more particular reference to FIGS. 3 and 4 the operation of the lock ring 170 and the sleeve bearing 178 will be explained in detail. The spring motor 196 is electromagnetically released by a proper command signal to drive the internal gear 194 which in turn rotates the enlarged drive gear 190. Upon rotation of the enlarged drive gear the associated threaded shaft 188 is advanced. The shaft 174 is thus slidably advanced together with its associated bearing cup 176, thereby engaging the sleeve bearing 178 over the cylindrical journal 168. Simultaneously, the rotation of the drive gear 190 rotates the power shafts 202 and 204, thereby rotating the associated gears 210 and 212. Upon rotation of the gears the ring gear 214 is advanced with respect to the housing 158. The advancing motion of the ring gear 214 is transmitted through the enlarged diameter thrust bearing 222 to slidably move the locking ring 170 with respect to the housing 158 and thereby disengage it from the stepped diameter of the shaft 16a. Accordingly, as shown in FIG. 4, the lock ring 170 is shown disengaged from the stepped diameter of the shaft 16a, and the sleeve bearing 178 is engaged on the cylindrical journal 168 thereby suspending one end of the shaft 16a for relatively low friction rotation in response to relatively low amplitude loads occasioned during orbit of the gimbal 10.

Accordingly, the invention provides a gimbal lock mechanism which totally encloses gimbal-bearing supports and encoder apparatus until the gimbal is unlocked. Particulate contamination is thereby excluded from the enclosed internal structure of the bearings and encoder. Further, atmosphere is retained within the enclosed structure, thereby insuring reliable operation thereof after a relatively long delay before use of the gimbal system.

Further modifications and embodiments of the invention are possible without departure from the scope of the invention, for example, a low shear strength sealant may be provided on the surfaces of the lock rings to insure further retention of atmosphere in the enclosed structure without interfering with the unlocking operation as described and the bearing journals may be of different configurations, and the gimbal lock rings may be utilized in conjunction with bearings which need not be initially disengaged from the gimbal shafts.

With reference to FIGS. 1, 5 and 6, there is shown a spiral flex lead module 24 which provides low resistance conduction paths for electrical signals while producing negligible interference with the pivotal motion of the gimbal 10. It is also unaffected by the hard vacuum and temperature excursions occurring in an outer space environment and is characterized by a high ratio of burn out current to rated current capability.

The spiral flex lead module of the present invention was conceived in response to the problem of conducting electrical power and other signals to the electrical components carried by the gimbal 10. Since the gimbal carries thereon torquers, encoders and electrical magnetic spring motor releases, a multiplicity of conduction paths must be provided. Such conduction paths must involve a relatively low friction torque and angular spring rate in order not to interfere with the pivotal motion of the gimbal.

Accordingly, as shown in FIG. 5 the spiral flex lead module 24 is shown provided with a plurality of cylindrical housings, only two of which are shown. However, additional housings may be included in stacked relationship as shown generally by the dash outline 224. Each housing is provided with a cylindrical sidewall 226 and end walls 228 and 230. With reference to FIGS. 5 and 6, each of the cylindrical housings contain therein a spirally wrapped flexible electrical-conducting strip 232 of a material such as copper. The outer spiral wrapping of the conductor 232 is secured at 234 in any well-known manner to a metal ring 236 of enlarged diameter and imbedded in the inner cylindrical sidewall 226 of its respective housing. The innermost spiral wrapping of the conductor 232 is secured at 238 to a reduced diameter metal ring 240. In turn the metal ring 240 is secured to a sleeve of insulating material 242. The sleeve is secured in surrounding relationship on the shaft 16. The spiral wrappings of the conductor 232 are insulated from one another by providing a spirally wrapped strip of insulating material 244. The outer spiral wrapping of the strip 244 is secured to the inner cylindrical sidewall of the housing at 246, located 180° away from the attachment point 234 of the conductor to the housing. The spiral wrappings of the insulating material 244 are spaced to comprise a passageway of scroll configuration electrically insulating the length of the spiral conductor 232.

As shown in FIG. 5, the spiral wrappings of the insulating strip 244 are secured along their entire elongated spiral lengths to the end walls 228 and 230 in any well-known manner. To complete the assembly an input conductor 248 is embedded in the outer cylindrical sidewall 226 and is in electrical contact with the metal ring 236. In similar fashion, an output conductor 250 is embedded in the inner sleeve of insulating material 242 and is in electrical contact with the metal ring 240. Accordingly, a conduction path is provided by the input conductor 248 through the spirally wrapped conductor 232 and through the output conductor 250. As shown in FIG. 6, the scroll of insulating material 244 is provided at selected points with enlarged projecting portions 252 and 254, for a purpose to be hereinafter described.

The spiral-wrapped scroll and the surrounding sidewall 226 and the end walls 228 and 230 mechanically limit the displacement of the spiral-wrapped conductor 232 in all directions, in order to protect it against shock and vibration. That is, the coils of the conductor 232 are mechanically supported to prevent excessive deflections thereof in response to shock and vibration. In the radial direction, the scroll wrappings prevent excessive radial displacement of any portion of the conductor. The scroll is firmly supported along its entire length thereof by being clamped or otherwise secured to the end walls 228 and 230. Under conditions of normal use, the scroll does not actually touch the spiral wrappings of the conductor in order not to interfere with current carrying capability thereof. However, the scroll will engage the spiral-wrapped conductor to prevent its excessive radial displacement. Electrical insulation between the scroll and spiral-wrapped conductor is not necessary since the conductor does not contact the scroll except during extreme load conditions.

However, such insulation may be provided as a further margin of safety.

When the spiral conductor experiences vibration loads, there may be repeated impact of the wrappings of the conductor against the scroll or housing. Accordingly, excessive stress or fatigue of the conductor is further prevented if the scroll and housing are made of a slightly resilient material. Alternatively, the scroll and housings may be coated with a resilient material (not shown). Accordingly, the spiral-wrapped conductor 232 incurs impact stresses instead of stresses tending to cause deformation thereof. The scroll and housing provide nonlinear damping for the spirally wrapped conductor which behaves under loading conditions as a spirally wrapped resilient spring having many resilient modes of oscillation.

The effect of such damping of the spirally wrapped conductor against the housing and scroll may be further clarified as follows. The clearance on all sides of the spiral-wrapped conductor will be on the order of 1.0 mm. Under vibration loads, the conductor will oscillate with respect to the housing such that its vibratory displacement is greater than the available clearance surrounding it. Accordingly, the spiral conductor will impact with the housing and scroll. The resultant impact stress is comparable to that occurring when an elastic body of small mass strikes a relatively large rigid mass represented by the housing and scroll.

The metal-conducting rings 236 and 240 serve as electrical terminals and heat conductors for the spiral-wrapped conductor.

For example, with alumina porcelain, fabrication of the housing may be characterized wherein the product of its cross section times the thermal conductivity constant for alumina porcelain will be equal to or greater than 10 times the product of the cross section of the conductor 232 times its thermal conductivity constant for copper. Accordingly, thermal cooling of the spiral-wrapped conductor is accomplished further by radiant heat transfer through the housing. In effect, a safety factor is provided for the rated current capacity of the conductor 232.

For example, the radial deflection of the conductor may be predicted. Where deflections thereof are the least, the spiral wrappings of the scroll 244 may be provided with the enlarged portions 252 and 254 which provide rigidity thereto yet preventing contact thereof with the conductor.

Other modifications and embodiments of the present invention are probable without departing from the scope of the invention as embodied in the appended claims wherein:

I claim:

1. In a gimbal system wherein each pivotal axis of the gimbal is supported by bearings, the improvement comprising: a housing containing the bearings, locking means in said housing and initially engaging said gimbal for preventing motion of said gimbal and for sealably enclosing said bearings in said housing, said bearings being initially disengaged from said gimbal, and drive means for subsequently disengaging said locking means from said gimbal and for engaging said bearings on said gimbal, whereby said gimbal is supported for pivotal motion.

2. The structure of claim 1 wherein said gimbal is provided with a journal, said bearings comprise a first bearing cup provided with a sleeve bearing and a thrust bearing and a second bearing cup provided with a thrust bearing.

3. The structure of claim 2 wherein said drive means includes a spring motor operatively connected to said first and second bearing cups for simultaneously axially engaging said thrust bearings on said journal and radially engaging said sleeve bearing on said journal.

4. The structure of claim 2 and further including resilient means associated with each bearing cup for providing soft stops for axial motion of said journal.

5. The structure of claim 3 and further including an encoder disc carried by said gimbal, encoder means for detecting the pivotal motion of said gimbal on said bearings, said locking means initially operating to seal said encoder disc and said encoder means within said housing, and projecting portions on said encoder means engageable on said encoder disc to provide hard stops for axial motion of said journal.

6. The structure of claim 1, wherein said gimbal is provided with a journal and said bearings include a bearing cup provided with a sleeve bearing, and said drive means includes a motor operatively connected to said bearing cup for radially engaging said sleeve bearing on said journal.

7. The structure as recited in claim 1 wherein said gimbal is further provided with a spiral flex lead module comprising a generally cylindrical housing enclosing a spirally wrapped strip conductor therein, said conductor being provided with an input conductor and an output conductor, and a spiral scroll insulating material defining a spiral passageway within the spiral flex lead housing for containing the conductor.